Figure 1:
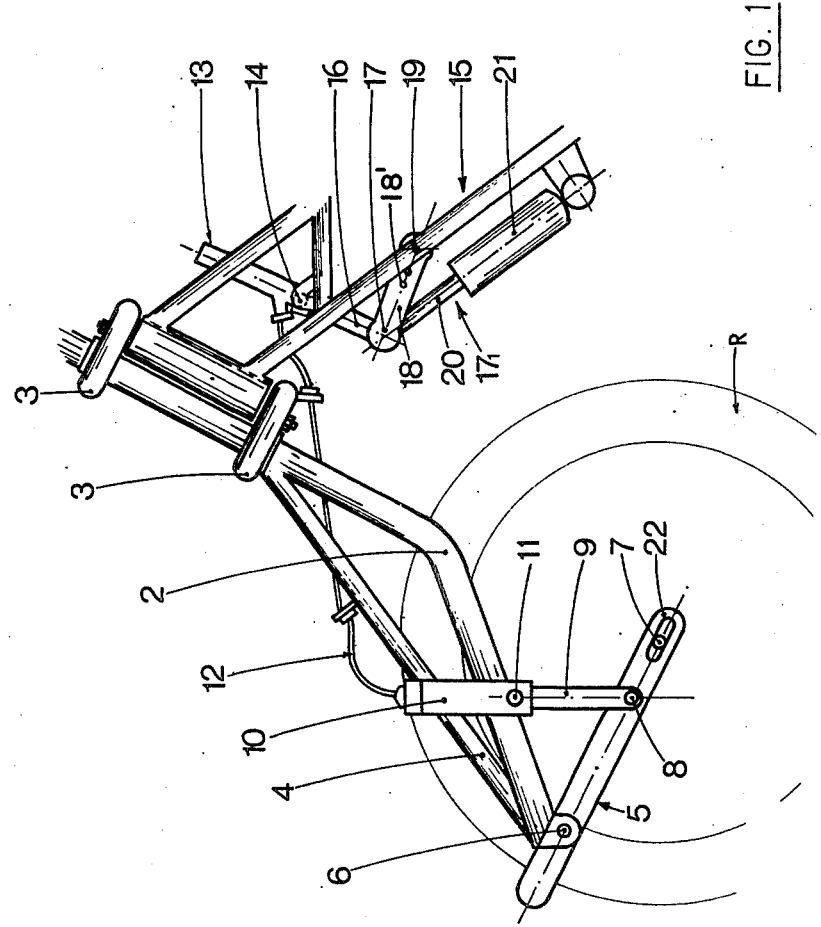

United States Patent [19]

Offenstadt et al.

[11] 4,186,936

[45] Feb. 5, 1980

[54] FRONT SUSPENSION, IN PARTICULAR FOR A VEHICLE HAVING TWO WHEELS AND VEHICLE PROVIDED WITH SAID SUSPENSION

[76] Inventors: Eric Offenstadt, 58 Avenue G. Clemenceau, 94700 Maison Alfort; Michel Houze, 43 rue St Louis en l'Ile, 75004, Paris, both of France

[21] Appl. No.: 791,032

[22] Filed: Apr. 26, 1977

[30] Foreign Application Priority Data

Apr. 26, 1976 [FR] France ................ 76 12245

[51] Int. Cl.² ............ B62K 21/02; B62K 25/18
[52] U.S. Cl. ................ 280/277; 180/227; 267/65 A; 280/286; 280/672
[58] Field of Search ........... 280/277, 276, 275, 279, 280/285, 284, 283, 286; 267/65 R; 180/32

[56] References Cited

U.S. PATENT DOCUMENTS

| 1,036,263 | 8/1912 | Kittle | 280/277 |
| 1,082,775 | 12/1913 | Stephenson | 280/277 |

FOREIGN PATENT DOCUMENTS

| 530779 | 8/1954 | Belgium . | |
| 1009956 | 6/1957 | Fed. Rep. of Germany . | |
| 488283 | 12/1953 | Italy | 280/276 |
| 566270 | 8/1957 | Italy | 280/277 |
| 251731 | 5/1926 | United Kingdom | 280/276 |
| 693646 | 7/1953 | United Kingdom . | |

Primary Examiner—John P. Silverstrim
Attorney, Agent, or Firm—Stevens, Davis, Miller & Mosher

[57] ABSTRACT

The suspension comprises a steering framework mounted on the frame of the vehicle. An arch-shaped pivotal suspension arm carries at one end the spindle of the front wheel of the vehicle and extends around the front wheel. The pivotal arm is pivoted to the steering framework. A shock-absorbing system having a variable flexibility comprises at least one shock-absorber. The shock-absorber is connected to a pivotally mounted link to damp movements of the link. The link is connected to the pivotal arm by a hydraulic or mechanical transmission.

4 Claims, 2 Drawing Figures

FRONT SUSPENSION, IN PARTICULAR FOR A VEHICLE HAVING TWO WHEELS AND VEHICLE PROVIDED WITH SAID SUSPENSION

The invention relates to a front suspension in particular for vehicles having two wheels such as motor cycles, motorized bicycles and mopeds, this suspension comprising a triangulated steering framework forming a fork and a damping system.

Known suspensions of this type mostly employ a telescopic fork. Such a telescopic fork lacks rigidity and strength since it consists of two parallel tubes which are subjected to bending stress. It is indeed difficult to make the bending tubes sufficiently rigid without having excessive sections.

When braking, the braking reaction produces a twisting effect which tends to prevent the sliding of the telescopic tubes and impairs the shock-absorbing effect. Again when braking, this known suspension has a tendency to plunge, especially as the castor angle of the fork is large. This castor angle moreover results in variations in the wheel-base of from 50 to 100 mm which produce relative accelerations and decelerations of the two wheels and result in losses of adherence of the front wheel and the rear wheel.

Moreover, the constant castor action of a conventional telescopic fork is insufficient upon extension (acceleration). It then produces weaving movements. On the other hand, it is excessive upon depression and renders the steering heavy.

With a telescopic fork, the steering system also includes a shock-absorbing system which increases the mass to be shifted by the handlebar and the steering inertia. Handling difficulties often result therefrom.

The shock-absorbing effect provided by such a fork is linear whereas its variable-pitch springs have a progressive action. Consequently, the shock-absorbing is excessive upon extension and excessively small upon depression with a lack of adherence in both cases.

An object of the invention is to avoid these drawbacks and to provide a suspension of the aforementioned type comprising a pivotal arch-shaped suspension arm carrying the spindle of the wheel and extending around the wheel, said arm being pivotally mounted on the steering framework and the shock-absorbing system comprising a shock-absorber which is operative on a link which is connected to the pivotal arm through a hydraulic or mechanical transmission.

According to one embodiment, the shock-absorbing system is a system having a variable flexibility comprising the shock-absorber connected to the frame of the vehicle and the link which is mounted to pivot on the frame and on the shock-absorber.

According to another embodiment, the transmission between the link and the pivotal arm is a hydraulic transmission comprising two jacks which are interconnected by a conduit and mounted to pivot on the fork and on the frame and on the pivotal arm and on the link.

The transmission may also be constituted by a mechanical transmission employing a push-bar or pull-bar.

Figure 2:
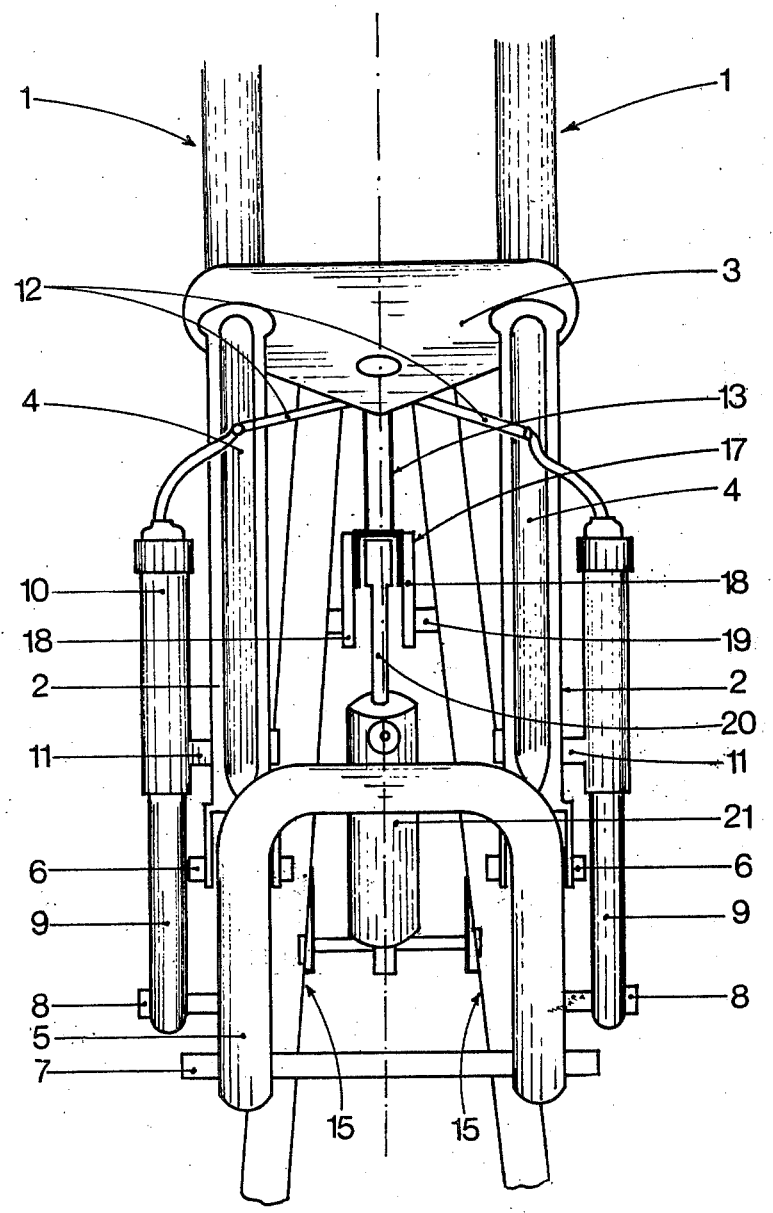

The invention will be understood from the ensuing description and the accompanying drawings which represent an embodiment of the invention and in which, FIG. 1 is a partial elevational view of a vehicle having two wheels provided with the front suspension according to the invention;

FIG. 2 is a corresponding left view.

The front suspension shown in FIG. 1 and FIG. 2 comprises a triangulated steering framework 1 which forms the fork proper and comprises two main tubes 2 the diameter of which is chosen to permit the mounting in the T-shaped elements 3 of a commercially available machine fork. These two tubes are bent as shown in FIG. 1 or welded at an angle and are stiffened by two other rectilinear tubes 4 so as to preclude longitudinal bending.

In the vicinity of the lower assembly of the tubes 2 and 4, a pivotal arm 5 is mounted by means of one or two suspension pins 6 to pivot on the triangulated framework (1, 2, and 4). The pivotal arm is arch-shaped and extends around the wheel and is connected to the left and right ends of the suspension pin so as to provide an improved lateral rigidity of the assembly. The pivotal arm 5 carries the spindle 7 of the front wheel R of the vehicle and is pivoted at 8 to the piston rod 9 of a hydraulic jack 10 or master cylinder which is mounted at 11 to pivot on the steering framework or fork 1. The jack 10 is connected by a conduit 12 or flexible pipe to a second hydraulic jack 13 which is pivotally mounted at 14 on the frame 15 of the vehicle. The piston rod 16 of the jack 13 is pivoted for example at 17 to a link 18 which is pivotally mounted on the frame 15 at 19.

The pivotal connection of the rod 16 may be provided at another point of the link 18 and even in overhanging relation on the link. The length between the pivots 17 and 19 may be varied by placing the pivot 19 in another of the apertures 18' shown in the link 18.

The end 17 of the link 18 is connected to the rod 20 of a shock-absorber 21 which is of known type including therein the suspension spring and is mounted on the frame 15.

In a modification, the suspension pin 6 may be disposed in front of the tire. The pivotal arm 5 may then have a rectangular shape with a single pin connecting the left and right part of the pivotal arm. In this case, the suspension pin may itself also ensure the lateral rigidity. The spindle 7 of the wheel may be slidable with respect to the pivotal arm 5 in an elongated aperture 22 so as to permit a variation in the castor action of the front wheel and in the wheelbase of the vehicle.

The suspension described hereinbefore operates in the following manner.

When under the effect of the braking forces the suspension pin 6 tends to move below the spindle 7 of the wheel, the pull exerted on the suspension arm 5 tends to raise this suspension pin. Consequently, the suspension prevents the plunging of the vehicle and constitutes an anti-plunge assembly. The shock-absorbing function is ensured by the variable-flexibility system 18 which is not connected to the pivotal arm 5 so that the shock-absorbing effect undergoes a progression which is different from the arm.

The suspension has a flexibility which varies with the depression. Indeed, the moving rod 20 of the shock-absorber 21 is connected at 17 to the link 18 which pivots on its pivotal connection 19. Upon the maximum depression, this link 18 tends to be perpendicular to the rod 20 of the shock-absorber 21 or even tends to form with the rod 20 an angle slightly greater than a right angle. The end of the link 18 then reaches the position $17_1$ which is located on the arc of a circle 17, $17_1$. The tangent at $17_1$ to this arc of a circle is parallel to the rod 20 of the shock-absorber 21. The displacement of $17_1$ consequently then corresponds to the displacement of the rod 20 of the shock-absorber 21.

On the other hand, upon maximum extension, the tangent to the arc of a circle at 17 approaches the perpendicular to the rod of the shock-absorber. The displacement of this rod then tends towards zero. When the length of the link 18 is equal to the travel of the shock-absorber, the shock-absorbing effect passes from 0 to a value X (in the case of the drawings, the shock-absorbing effect passes from 0 to X/2). The longer the link 18 with respect to the travel of the shock-absorber, the smaller will be the variable flexibility effect.

The shock-absorbing is transmitted to the pivotal arm 5 through the hydraulic jacks 10 and 13 and the conduit 12. In the case of a mechanical transmission, this is constituted by a pull-bar (tie bar) or a push-bar which connects the pivotal arm 5 to the link 18, this bar being mounted by means of ball joints at both ends. In this case, it is necessary to choose the angles made by the bar with the pivotal arm and the link in such manner that they do not oppose the variable flexibility effects.

However, the hydraulic transmission is often preferable, since the flexible pipe or conduit 12 enables the shock-absorber 21 to be mounted at any point of the vehicle independently of the steering system.

As concerns the operation of the pivotal arm 5, it should be observed that its point of pivotal connection to the steering framework is more remote from the rear suspension arm than in the case of a conventional fork, so that the basis of support of the vehicle is lengthened.

This pivotal arm operates in a manner parallel to the rear arm and thus produces variations in the wheelbase which become four to five times less than with a conventional telescopic fork.

Moreover, as the spindle of the wheel no longer travels along a parallel to the steering axis, the castor action is increased by about $\frac{1}{3}$ upon acceleration or lightening.

Note also that the wheel does not rise systematically toward the lower T-shaped element 3 of the steering system but pivots about the suspension pin 6. Under these conditions, the clearance between the tire and the lower T-shaped element 3 of the steering system can be reduced.

To summarize, the invention results in the following advantages:

1. The rigidity and strength are greater than those of the known constructions owing to the triangulation of the steering framework.
2. The shock-absorbing effect is greater upon braking owing to the absence of parasitic frictions.
3. Stability and comfort are increased and the pitching phenomena are reduced owing to the anti-plunge mounting; the basis of support is also larger.
4. As the variations in wheelbase are four to five times smaller than in known constructions, the relative accelerations between the two wheels are practically eliminated, which results in an improved adherence of the front and rear wheels.
5. Road holding and comfort are improved, since the variable flexibility avoids the use of pre-stressed suspension springs. There is thus provided a very flexible suspension when travelling in a straight line when there is no depression. The suspension becomes normal when there is a depression in particular in bends.
6. The steering inertia is reduced, since the mass of the shock-absorber is shifted to another part of the vehicle. The handlebar is thus easier to move and the stability is improved in the case of acceleration, especially as the castor action increases in this case.
7. The decrease in the castor action in the case of depression improves the handling qualities when entering bends.
8. The regulation of the link enables the suspension to be adapted to the load.
9. Mass-produced adjustable automobile-type shock-absorbers may be mounted, which have improved characteristics and are cheaper than shock-absorbers intended for vehicles having two wheels.

It must be understood that the invention is not limited to the embodiment described hereinbefore and illustrated, in respect of which other forms and arrangements may be envisaged without departing from the scope of the invention.

Having now described our invention what we claim as new and desire to secure by Letters Patent is:

1. A front suspension for a vehicle having an unsuspended part which comprises two vehicle wheels and a suspended part which comprises a frame and a steering framework forming a fork structure pivotally mounted on the frame, the front suspension comprising a substantially U-shaped pivotal suspension arm having two branches pivotally mounted on the steering framework and a transverse portion extending across and around a front wheel of said two wheels, which front wheel has a spindle, the branches carrying the spindle adjacent ends of the branches, a shock-absorbing system comprising at least one telescopic shock-absorber including a suspension spring, the shock-absorber having a part pivotally mounted on said suspended part of the vehicle and a shock-absorber actuating rod axially slidable in said shock-absorber part, a link pivotally mounted on said suspended part, a first pivotal connecting means pivotally connecting the link to the rod, and a hydraulic transmission pivotally connecting the arm to the link, the angular relationship between the link and the rod of the shock-absorber being such that a tangent to the arc travelled through by said first pivotal connecting means and located at said first pivotal connecting means progressively approaches an orientation in which it is parallel to the rod as said first pivotal connecting means travels for a first position corresponding to an outermost position of the rod relative to the shock-absorber part and corresponding to an undepressed state of the front suspension to a second position corresponding to an innermost position of the rod relative to the shock-absorber part and corresponding to a fully depressed state of the front suspension, said front suspension further comprising at an end of said transmission adjacent the arm a member which has an axis along which it is movable, and second pivotal connecting means pivotally connecting said member to the arm, the angular relationship between the arm and said member being such that a tangent to the arc travelled through by said second pivotal connecting means and located at said second pivotal connecting means progressively approaches an orientation in which it is parallel to said axis along which said member is movable as said first pivotal connection means travels from said first position to said second position thereof, said hydraulic transmission comprising a conduit interconnecting two jacks, one of said jack being connected to the framework and to the pivotal arm and the other jack being connected to the frame and the link.

2. A suspension as claimed in claim 1, wherein the steering framework extends forwardly of the spindle of the wheel and the pivotal arm extends forwardly of said spindle.

3. A suspension as claimed in claim 2, wherein the pivotal arm has a length which is of the order of magnitude of the radius of the wheel.

4. A suspension as claimed in claim 1, wherein the shock-absorber is connected to the frame of the vehicle and the link is mounted to pivot on the frame.

* * * * *